United States Patent
Tiso et al.

(10) Patent No.: US 12,211,356 B2
(45) Date of Patent: Jan. 28, 2025

(54) CONTROLLED ACCESS GATE

(71) Applicant: ULXIMA SOCIETÀ A RESPONSABILITÀ LIMITA SEMPLIFICATA, Samone (IT)

(72) Inventors: Marco Tiso, Borgo Valsugana (IT); Elisa Gambato, Samone (IT)

(73) Assignee: ULXIMA SOCIETÀ A RESPONSABILITÀ LIMITATA SEMPLIFICATA, Samone (IT)

(*) Notice: Subject to any disclaimer, the term of this patent is extended or adjusted under 35 U.S.C. 154(b) by 20 days.

(21) Appl. No.: 17/614,319

(22) PCT Filed: May 20, 2020

(86) PCT No.: PCT/IT2020/050128
§ 371 (c)(1),
(2) Date: Nov. 24, 2021

(87) PCT Pub. No.: WO2020/240602
PCT Pub. Date: Dec. 3, 2020

(65) Prior Publication Data
US 2022/0228419 A1     Jul. 21, 2022

(30) Foreign Application Priority Data
May 24, 2019   (IT) .................... 102019000007232

(51) Int. Cl.
*G06V 40/00*     (2022.01)
*G07C 9/10*      (2020.01)
(Continued)

(52) U.S. Cl.
CPC ............ *G08B 13/08* (2013.01); *G06V 40/00* (2022.01); *G07C 9/10* (2020.01); *G07C 9/253* (2020.01); *G07C 9/27* (2020.01)

(58) Field of Classification Search
CPC . G07C 9/27; G07C 9/28; G07C 9/257; G07C 9/10; G01S 13/887; G06V 40/172; G06V 20/59; G06V 40/00; G06K 9/00342
See application file for complete search history.

(56) References Cited

U.S. PATENT DOCUMENTS 11,024,105 B1 *  6/2021  Brand ................ G06K 7/10366
11,227,458 B1 *  1/2022  Farah ..................... G01S 17/66
(Continued)

FOREIGN PATENT DOCUMENTS

EP          3203447 A1    8/2017
WO       2017/030821 A1   2/2017

*Primary Examiner* — Vernal U Brown
(74) *Attorney, Agent, or Firm* — Hedman & Costigan, P.C.; James V. Costigan; Kathleen A. Costigan (57) ABSTRACT

A controlled access entrance gate, comprising a frame or structure (11) that defines an entry area (I1), an exit area (I2) and a transit area (P) of a user (U), a actuation unit (13), which allows the passage of one or more subjects (U), an electronic control unit (14) and a plurality of sensors or cameras (15, 16). The sensors or cameras (15, 16), which can also be used as an independent kit and can be associated with any type of passage or area to be controlled, are suitable for detecting the data relating to the distance (DT) between each sensor (15, 16) and each subject (U) present in the entry area (I1) or in the exit area (I2) or in the passage area (P) and the speed, trajectory and tracking parameters of the subject (U). An electronic control unit (14) receives and processes data through interpolation processes and machine-learning and/or deep-learning algorithms, so as to autonomously learn the characteristics of the passage and predict the forms and probabilistic directions of each subject (U) inside the volume corresponding to the entry (I1) and exit (I2) areas and to the transit area (P) of the passage.

8 Claims, 5 Drawing Sheets

(51) Int. Cl.
   *G07C 9/25*   (2020.01)
   *G07C 9/27*   (2020.01)
   *G08B 13/08*  (2006.01)

(56) References Cited

U.S. PATENT DOCUMENTS

| | | | |
|---|---|---|---|
| 11,410,462 B2* | 8/2022 | Ogawa | G07C 9/10 |
| 2004/0017929 A1 | 1/2004 | Bramblet et al. | |
| 2019/0154872 A1 | 5/2019 | Leduc | |
| 2021/0256785 A1* | 8/2021 | Kanteti | H04W 52/0254 |

* cited by examiner

CONTROLLED ACCESS GATE

The present invention relates to a controlled access gate for detecting and regulating the flow of people, animals, objects and/or vehicles (such as a driveway), which pass through it.

The invention is also extended to a mounting kit of a series of sensors, which is capable of transforming any existing area or passage with or without barriers into a controlled access area or entrance passage; the kit basically includes a series of sensors and an electronic control unit, which, are able, if applied to any generic gate without it, even without any particular installation predisposition, nor predefined position and/or orientation (possibly also on the gate mobile barriers), by means of machine-learning and deep-learning algorithms, to learn autonomously and automatically what type of gate it is (including hinged doors, retractable, sliding, folding, telescopic, lifting door, concealed under the floor, such as pure bollards, internal or external to the structure, and/or if it is a mobile gate, a tripod or full-height turnstile, a revolving door, a security compass, a gate or other barrier type), through the acquisition by the sensors of the shape of the barrier to regulate the passage, and to determine the physical dimensions of the gate itself and the barriers (if operating), their space and how they are handled. In practice, the sensors can be applied to any generic gate that does not have one.

The kit controls the opening and closing of the barrier and manages the gate according to the scenarios detected by the same kit in the surrounding passage area independently and according to the type of gate or passage area, the type of barrier and the its size, the type of movement, as well as the size of the gate and the passage area, transforming in a practical and immediate way any area or gate into a controlled access area or gate and allowing the passage of at least one subject, also from different and opposite directions, one at a time or simultaneously, safely and unharmed for those authorized to pass.

In particular, the present invention relates to a control input for detecting at least one person, an animal or an object (also generically defined as a subject) within a controlled access area in order to identify attempts of fraudulent access by of at least one unauthorized person, such as that of following an authorized person at a short distance or that of entering the controlled area on the shoulders of the authorized person, or unauthorized entrances from the opposite direction to the one followed by the authorized subject or entrances and exits by unauthorized persons following authorized persons (for example, an authorized person with an unauthorized object or animal or another unauthorized person or other combinations between generic authorized and unauthorized subjects, between authorized subjects and other authorized subjects and between subjects unauthorized and other unauthorized parties). Therefore, the present invention falls within the field of the security of a controlled access area.

Controlled access gates are currently known to detect the presence of people within an area or an access detection area and to assess whether the person is authorized or not, in order to avoid fraudulent use.

Usually, these controlled access gate, capable of detecting and tracking in real time every single movement of a user through the input, have sensors mounted at a certain height or in known positions and bound to the detection algorithm, so if these sensors are moved they will lose the uniqueness of correlation between the algorithm, their position and orientation, providing incorrect results and requiring continuous calibration by expert personnel and/or rewriting of the detection algorithm; in particular, are normally used photocells or, in the case of more sophisticated systems, ToF ("Time of Flight") or "3D-vision" type sensors or sensors that are installed at significant heights (even above 2.3-2.5 meters) or mounted on the ceiling, above the gate of the controlled area, for the purpose of proper functioning and to allow the sensor to have a wider detection area and less susceptible to measurement errors. Considering the height from which they operate, considering that their position and orientation are constrained in relation to the detection algorithm (thus requiring time for an accurate positioning and for their calibration, including the adjustments of the detection algorithm and the settings by specialized personnel) and also considering that these sensors must also have a high sensitivity, this leads to an increase in costs compared to the possibility of mounting less sensitive sensors, therefore less expensive, capable of operating from a lower height or in any case from any position and/or orientation, even random ones.

Furthermore, the "ToF" or "3d-vision" type cameras must be mounted no less than 2.3-2.5 meters from the floor for their correct operation and this leads to consequent complications for their installation and maintenance. Therefore, remains the need to provide a controlled access gate, that offers a solution to problems such as the cost of the sensors, the constraints on their positioning, the types that can be used and their reliability.

The main purpose of the present invention is therefore to provide a controlled access gate with sensors which are highly effective despite having low sensitivity and which can be installed in any position, even randomly.

Another object of the present invention is to eliminate certain constraints on the positioning of the sensors, typical for example of the "ToF", "3D-vision" type sensors, photocells, etc.

Another purpose of the invention is to provide a controlled access gate, which is economically convenient, compared to the known art, while maintaining the same functionality.

A further purpose of the invention is to create a controlled access gate, which allows simple maintenance.

Another object of the invention is to provide controlled access gate, which is capable, even starting from partial or incomplete detections or of a poor quality and/or resolution, to detect and track subjects, such as people, animals or objects, which pass through them, for example by reworking the input data, through neural networks and/or "machine learning" or "deep learning" algorithms; the re-processing of the input data takes place starting from the data coming from a plurality of sensors also located in non-optimal positions, any (even random) and in themselves also providing individually unnecessary information, which, however, allow, in the set of information coming from all the sensors grouped together, an indirect and probabilistic detection of higher definition of all the space of the access gate.

It follows that these sensors can also be thrown or positioned with any criteria (even random) in an area subject to passage, without changing the final result of detection and use of the invention, for the purpose for which it is intended. These and other purposes are achieved through a controlled access gate according to the attached claim 1, to which reference is made for brevity.

Further detailed applicative features of the invention are highlighted in the related dependent claims.

Said aims and advantages, as well as others that will emerge later, will appear to a greater extent from the following description, relating to some preferred applicative forms of the controlled access gate, which is the object of the invention, provided by way of example and illustration, but non-limiting, with reference to the attached drawings in which.

With reference to the mentioned figures, an example of controlled access gate, according to the present invention, substantially comprises at least a frame or structure 11, an actuation unit 13, an electronic control unit 14, a plurality of sensors 15 and/or cameras 16, a badge reader 17 or another device capable of giving a valid access passage credential, a database 18.

The access gate object of the invention may not include the use of physical barriers that regulate the passage or it may include at least one door 12 hinged and/or retractable, sliding, bellows, telescopic, vertical sliding or concealed doors under the floor (bollards), internal or external to the structure 11, or in any case any type of barrier capable of fulfilling the function of preventing the passage of the gate; furthermore, the invention is also applicable to other forms of controlled access gate, such as for example mobile gates, mechanical or electronic turnstiles, tripod turnstiles, full height turnstiles and revolving doors and barriers in general, whether they are operated manual, servo-assisted, motorized or automatic.

In particular, even if in the course of the discussion reference will be made to at least one and preferably two doors 12 which regulate the passage in correspondence entrance gate, it is to be understood that the passage according to the invention is not limited to the types of barriers mentioned and it can generally include any type of physical or virtual barrier designed to preclude and regulate the passage of the gate by at least one person, such as people and/or animals.

In the exemplified implementation example according to which hinged doors 12 are used as the physical barrier of the passage, each door 12 is fixed to the structure 11 so that it can move from a closed position A or partially closed to an open position B or partially open and vice versa; it is also possible that the door 12 moves from a closed position A to an open position C and vice versa (in practice, the door 12 can perform a movement from 0° to 90° or from 0° to 180° clockwise or anticlockwise from the closed position A).

Furthermore, these doors can move or not in unison in a synchronized way and/or in the same passage direction or independently and/or in opposite passage direction with the passage of users U in one or both directions. The frame 11 preferably comprises a first wall 11a and a second wall 11b positioned parallel to each other, so as to define a transit area P between them. The walls 11a, 11b have respective internal surfaces preferably positioned one opposite the other.

The door 12 is fixed to one of the walls 11a, 11b of the frame 11 and is positioned, with respect to the walls 11a, 11b, so as to block the passage when it is in the closed position A and to free the passage when it is in the open positions B or C.

Preferably, according to the preferred embodiment above, the access gate has two doors 12, in which a first door 12 is fixed to the first wall 11a and the second door 12 is fixed to the second wall 11b; still preferably, the two doors 12 can be moved, respectively, with respect to the first 11a wall and the second 11b wall.

In addition, the controlled access gate can be one-way, allowing the crossing of the in a single direction (in this case, the doors 12 move between positions A and B) or even two-way, thus allowing a two-way direction passage of the authorized subjects AU (in this case the doors 12 move between the positions A and C).

Preferably, the controlled access gate according to the invention can detect and trace the transit of multiple subjects U (people, objects, animals) that move substantially in the same direction or in even opposite directions in the entry and exit areas I1, I2 to the gate and through the transit area P; in this regard, the gate can be in alternate directions or provide for simultaneous passage in both directions.

In addition, according to the invention, it is also possible to predict the most likely direction that the subjects will take in the monitored area and then predict fraudulent or need scenarios to facilitate authorized subjects according to their characteristics (for example, handicapped persons, children, elderly persons with walking problems or persons with difficult objects which reduce their ability to walk and/or to pass). The actuation unit 13 is connected to the door 12 and is capable of moving the door 12 from closed position A to open position B or C and vice versa; in addition, the electronic control unit 14 communicates with the actuation unit 13, so that it can operate door 12. Preferably, the control Unit 14 communicates with the actuation unit 13 and a set of sensors 15 and/or cameras 16 via wireless connections, such as Wi-Fi, Bluetooth®, infrared, etc. or also by physical connections, such as connecting cables.

Figure 1:
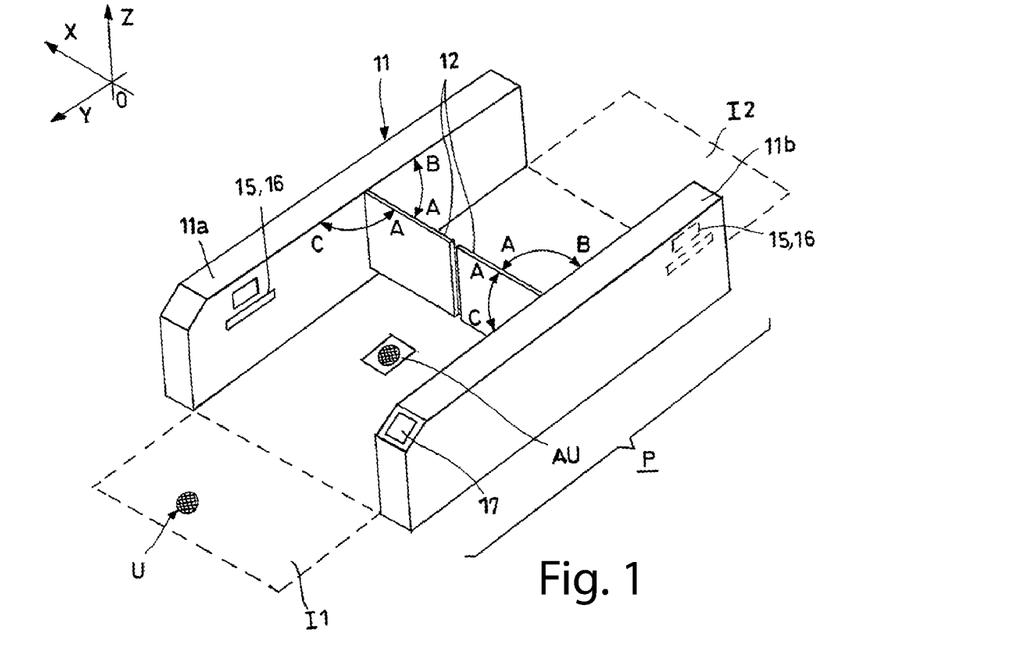
FIGS. 1 and 2 show two schematic perspective views of respective alternative embodiments of the controlled access gate, according to the invention.
Figure 2:
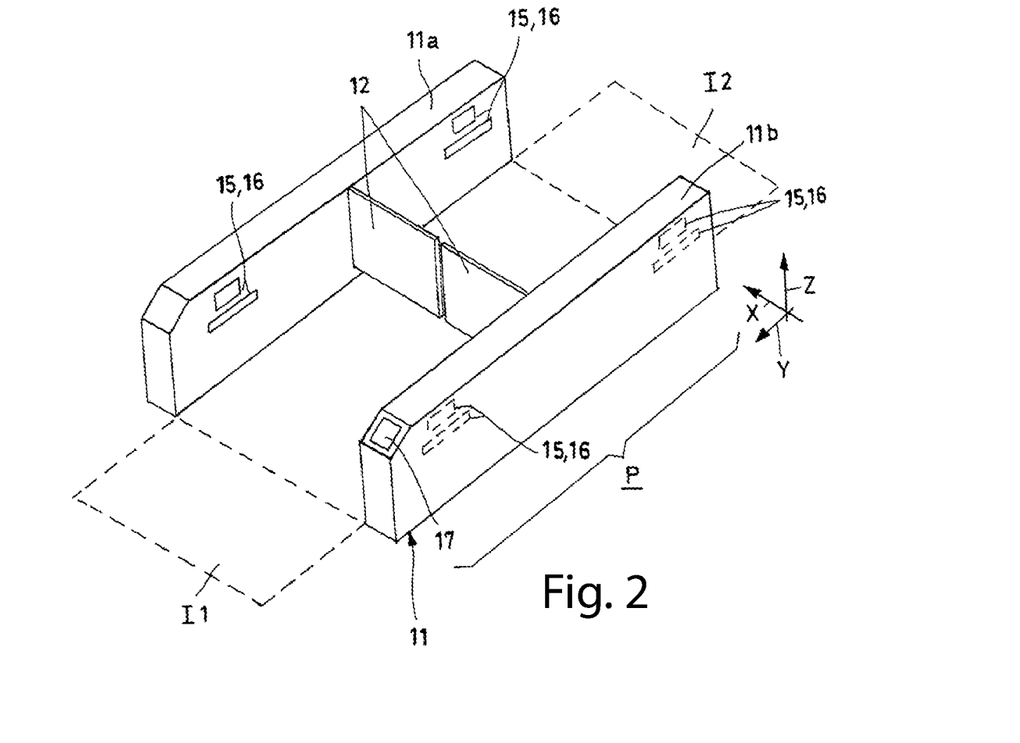
Figure 2A:
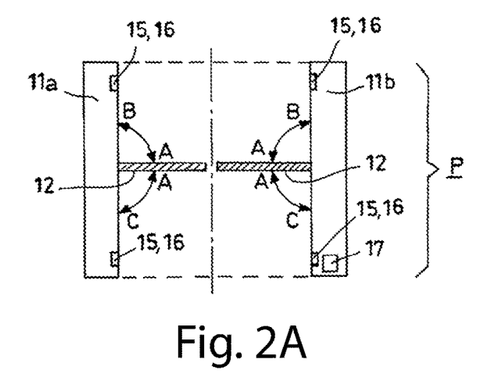
FIGS. 2A, 2B, 2C, 2D and 2E show a series of schematic plan views relating to the operation of the controlled access gate of FIG. 2, according to the present invention.
Figure 2B:
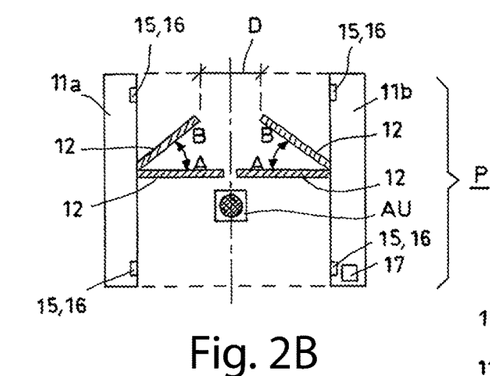
Figure 2C:
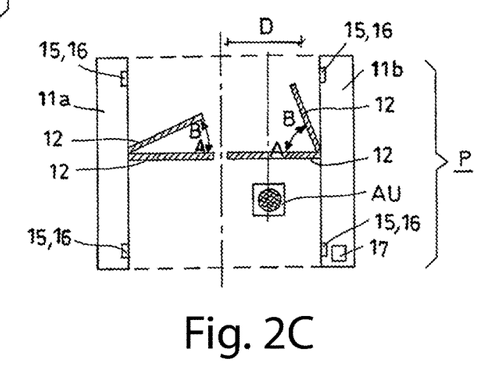
Figure 2D:
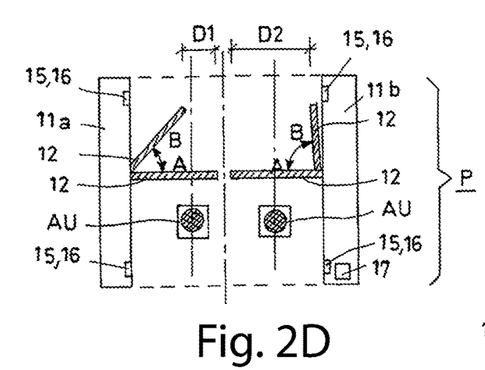

According to some embodiments of the invention, without limitation the actuator 13 can be controlled so as to open the doors 12 independently of each other and/or partially, in order to pass only the authorized subject AU and preclude the transition to unauthorized subjects that may position themselves in parallel to the subject AU or unauthorized subjects that come from the opposite direction to that of the authorized entity subject; in this case, the doors 12 can open at the same time and at the same opening angle if the authorized subject AU is in the middle of the transit area P (FIG. 2B), or one of the doors can open at a greater angle than the other (FIG. 2C) if the authorized subject AU is in front of this door (while the other door opens by a smaller angle to prevent any fraudulent entry) or the two doors 12 can open at the same angle or with even different angles in the presence of authorized subjects AU in front of such doors 12, even with different passage widths D1, D2 (FIG. 2D). In any case, these openings of the doors 12 are implemented, by means of the control unit 14, so that there is always a reduced access gate, having a certain width D (for example, equal to 500 mm) for the passage of the authorized subject AU quickly and such as to preserve the safety and security of the subjects during the transit.

In particular, the width D is variable and modulated according to the minimum space necessary to allow the passage of the subject or subjects authorized AU quickly, safe and unharmed; such width D can only be formed around the area of entry of the authorized subject or subjects AU authorized that is where the authorized subject or subjects AU can pass precisely, which does not mean only in the center of the transit area P, but also wherever the user U is present in front of the barrier, compared to the above-mentioned center line of the transit area P.

Figure 2E:
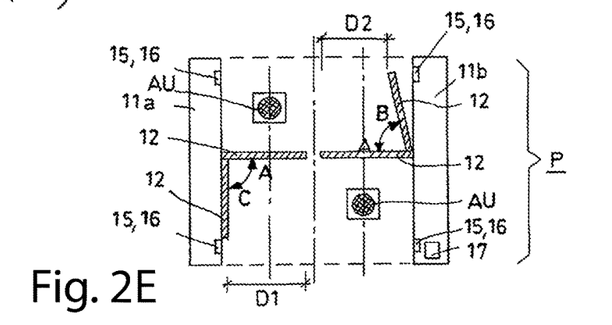
Figure 3:
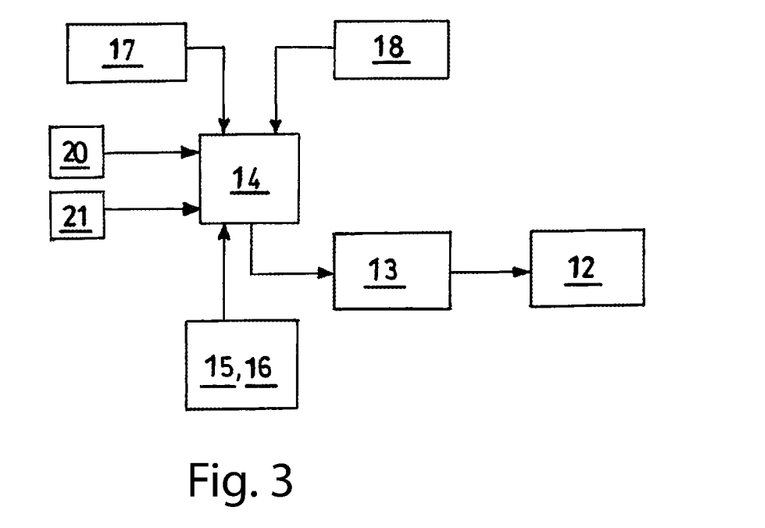
FIG. 3 shows a block diagram of the operation of the controlled access gate, according to the present invention.
Figure 4:
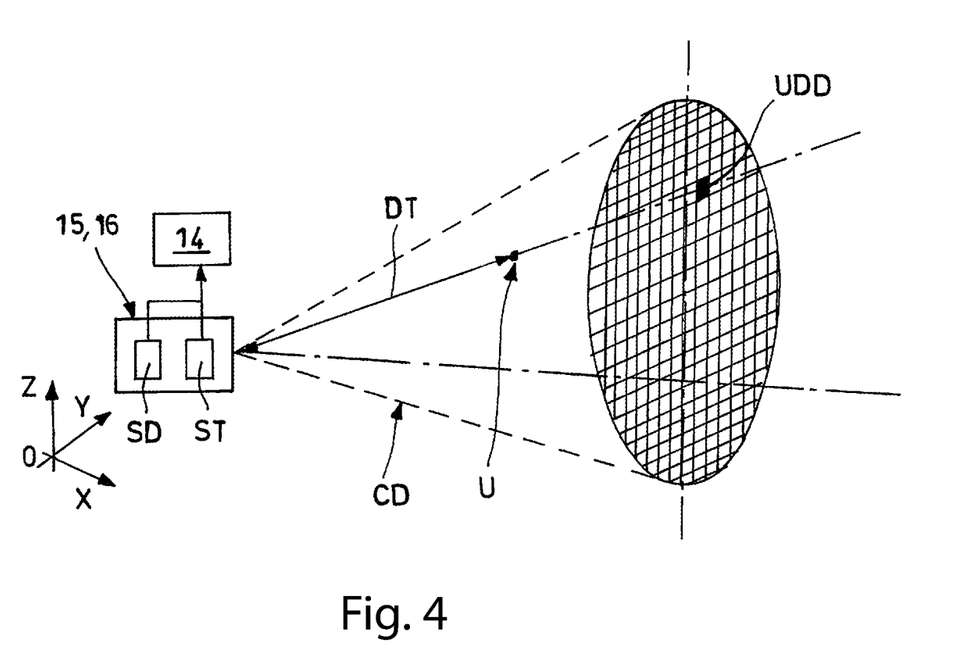
FIG. 4 shows a static example diagram of the detection method of the sensors used in the access gate, according to the present invention.
Figures 5, 5A, 5B, 5C:
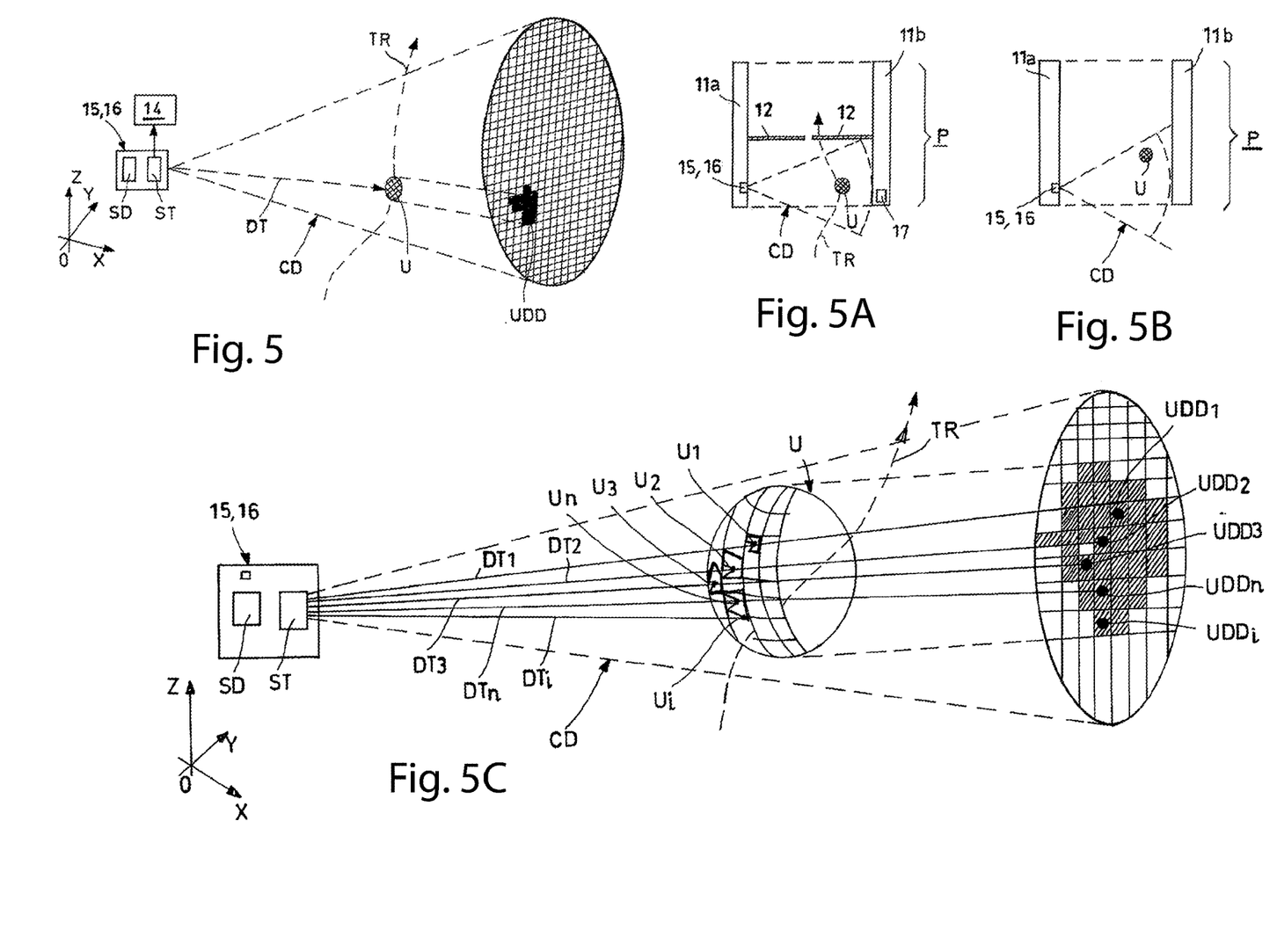
FIGS. 5 and 5C show two dynamic example schemes of the detection mode of the sensors used in the access gate, according to the invention.
FIGS. 5A and 5B show two views of the detection mode of FIG. 5 during the passage of a subject inside the access gate, according to the present invention.
Figure 6A:
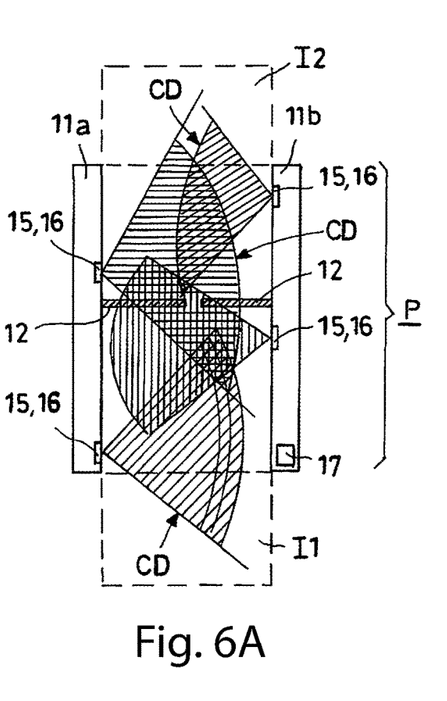
FIG. 6A shows a plan view of an access gate according to a first embodiment, with highlighted the detection areas of the sensors used, according to the present invention.
Figure 6B:
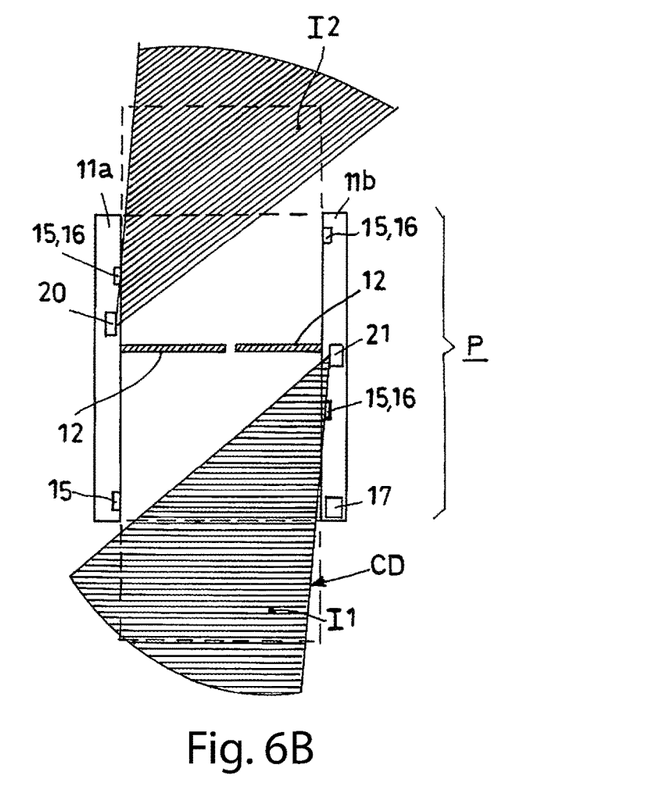
FIG. 6B shows a plan view of an access gate according to another embodiment, with highlighted the detection areas of some sensors used, according to the present invention.
Figure 6C:
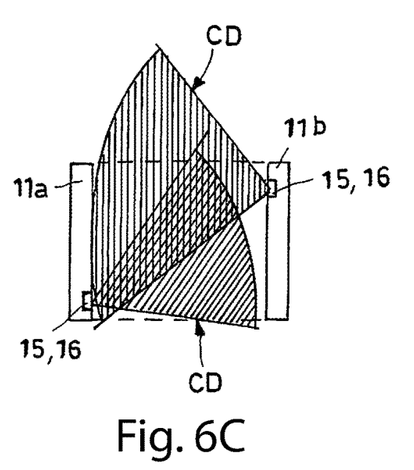
FIG. 6C is a front view of the access gate of FIG. 6A, according to the invention.
Figure 6D:
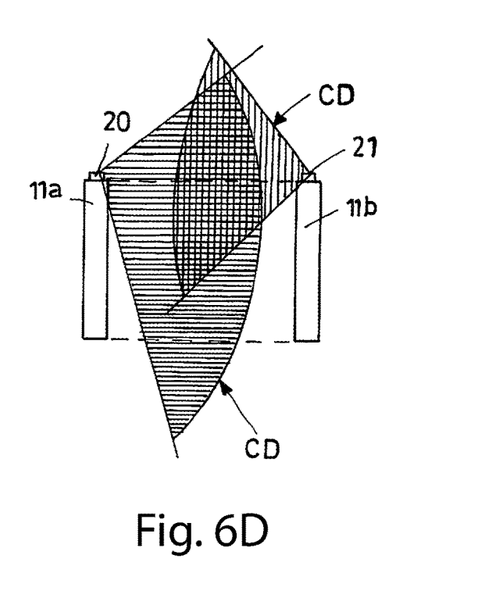
FIG. 6D is a front view of the access gate of FIG. 6B, according to the invention.

In addition, these doors 12 can move or not to join in a synchronized way and/or in the same direction of transit or independently and/or even in opposite directions of transit (FIG. 2E). In particular, according to the present invention, sensors 15 or cameras 16 are used for the detection, at least partially, of the distance DT between the sensor 15 or camera 16 and the user or subject U approaching the gate and still present in the entry and exit areas I1, I2 and in the transit area P, whose variation in time allows to calculate the instantaneous position, the instantaneous speed and the trajectory (and the entire tracking) of the user U and to predict the future evolution of such trajectory; as already mentioned, even if in the following part of the discussion reference will be made specifically to sensors 15 applied to the access gate according to the invention, it is to be understood that cameras 16 are also suitable to be used.

A typical sensor 15, which is the subject of this invention, incorporates at a functional level at least one distance DT detection sensor SD and at least one image detection camera sensor ST and has its own detection cone CD and a unit detection resolution UDD of the subject U present in the cone CD.

For each of the sensors 15, each in its own polar coordinates x, y, z of the relative reference system of the sensors SD, ST, since the position of the sensor 15 with respect to the absolute reference system X, Y, Z associated to the access gate along the transit area P is known, it is possible to know the position in time of the user U inside the detection cone CD and therefore also inside the areas of passage P and of inlet and outlet I1, I2.

Each sensor is able, through the control unit 14, to transmit its position and orientation of the related reference system x, y, z, and, again through the control unit 14, to determine the real-time automatic position of the absolute reference system X, Y, Z, the absolute reference of which the position itself is determined automatically in real-time by the control unit 14, by associating the origin zero position of the absolute reference system based on the position measured by the gate control unit 14. This is done in real time and automatically even if sensors 15 are in motion with respect to frame 11, dynamically.

In particular, the fact that each sensor 15, 16 is equipped with wireless communication (via WI-FI, Bluetooth®, etc.) or wired communication with the electronic control unit 14 makes it possible to identify the sensor 15, 16, as well as, automatically and in real time, its relative position and orientation x, y, z relative to the absolute reference system X, Y, Z associated with frame 11 of the gate; this also determines the possibility to move sensors 15, 16 at will or even to throw them randomly in the detection volume corresponding to the entry and exit areas I1, I2 and the transit area P of the gate, without any particular requirement and/or orientation to be followed other than that for which at least two detection cones CD of respective sensors 15, 16 overlap, as all sensors 15, 16 in any case self-calibrate with respect to the control unit 14 once they are installed, maintaining unchanged the functional result of the whole over time; in particular, in a dynamic way (that is, with sensors 15, 16 in motion, for example with some of them placed on barriers or moving doors 12), sensors 15, 16 send their position and orientation, both at the time of installation and thereafter, automatically and in real time, to the electronic control unit 14 and the unit 14 is thus able to trace the location of the same and to carry out the detection procedures as described above.

In this regard, sensors 15, 16 can constitute "portable" objects and be part of a specific kit to be applied to any access gate, even existing, as they can be moved at will and then self-calibrate via the control unit 14, with which they communicate via wireless or wiring, thus maintaining unchanged over time the functional result of the whole.

The camera sensor ST detects the discrete image in pixels and associates to this image, within the detection cone CD, the distances DT over time and then the position of the user U that appears in the image taken by the camera sensor ST for each unit detection resolution UDD.

The image and the position of the user U is partial, as possibly referring to a single cone CD, it is not necessarily of high quality and/or capable of representing the overall scene of movement of the user U along the entry and exit areas I1 and I2 and along the transit area P; in particular, the detection of the single sensor 15 does not allow to initially understand if one or more subjects U transit in the transit area P, also including the case in which, for example, one or more people have or carry one or more animals and/or objects carried by the same person or by another person (such as infants, children, animals or objects), nor if in the acquired image parts of a person or more people or parts of objects or animals, considering that each sensor 15 can be positioned anywhere, in principle, within the entrance passage area, therefore also in unfavorable areas, at insufficient heights, in hidden and inaccessible and/or not ideal corners to view the scene.

The sensors 15 or the cameras 16 then communicate with the electronic control unit 14 so as to send signals relating to the distance DT, to the parameters of the instantaneous position, instantaneous speed and trajectory of each user U and in general to the activities that occur inside each detection cone CD and inside all cones CD of all sensors and/or cameras 15, 16 of a detection area and/or volume, which includes the entry area I1 or I2 in the which at least one user U is before entering the transit area P, the itself and the exit area I2 or I1 crossed by the user U subsequently to the transit area P. In particular, for the purposes of this invention, where mentioned the distance DT between a sensor 15, 16 and a user U, considering that a user U is three-dimensional, it is to be understood that each sensor 15, 16 detects and measures, for each unit UDDi (with the =1, 2, 3, ... n), I at a distance DTi (with i=1, 2, 3, ... n) of each element Ui (with i=1, 2, 3, ... n) of the user U from the sensor (15, 16) itself, associating it possibly with each pixel of the image detected by the sensor ST, for a subsequent 2D/3D reconstruction of the user U by the control unit 14.

The badge reader 17 or other equivalent device is connected to the control unit 14 so as to be able to read information on a badge or other identification element of a user U (also in combination with one or more further systems and/or identification devices) and send the information to the control unit 14 for processing, in order to verify the identity of the subject in real time. To this end, the control unit 14 can also be made by one or more physically distinct units, each of them performing different functions, also via a cloud. For example, verification of the identity or nature of the subject can be performed by one of these control units 14 in the Cloud simply by giving an authorization or confirmation signal on the identity or nature or characteristic relating to the subject; this signal is used by another control unit 14 instead responsible for managing this signal and other signals from other control units for the proper management of the functioning of the passage for the controlled gate. Therefore, in the description, whenever the control unit 14 is mentioned, it is to be understood in its general sense as possibly consisting of one or more control units, as a whole constituting the overall control unit 14. The reader 17 it can be a card reader or other recognition medium, a biometric reader, etc., while the recognition element can be, for example, a ticket or a pass, therefore endowed with a validity, preferably endowed with a code bars or a magnetic strip, or a biometric system.

The database 18 contains the information of the authorized subjects AU and is connected to the electronic control unit 14, so that it can search the database 18 and compare the information of the user U with that contained in the database 18 to check whether this user U is authorized or not.

The database 18 must be understood in a general sense, or physically constituted by one or more physically distinct units, also via Cloud, each also with data referring to the identification of different characteristics regarding the user U and/or associated with it, for example a database for the type of people, one for the type of objects, one for the identity of the people, etc. and/or containing data relating to the belonging of people to groups or to the belonging of people or objects or animals in correlation with each other. In the description whenever database 18 is mentioned, is to be understood such a generalized meaning of database 18. Therefore, in the generalized meaning of control unit 14 and database 18, it follows that each of the possible control units can refer to its own specific database to draw information from, or a database can be shared between multiple control units and vice versa. This implies, in a further generalized sense, that the databases 18 and the relative control units 14 can also, in general, be shared with multiple access gates physically positioned remotely in the same site or positioned in other sites in the world (worldwide).

Therefore, multiple controlled access gates can share each of them information detected by each of the controlled access gates, even at different times in time, regarding the subjects, so that, through artificial intelligence, it is possible to refine probabilistically about the identity and type of subjects, at different times, and interactively update the data relating to them for subsequent use over time from any of the controlled access gates that are part of the same network or that share the databases 18 in which the user U transits subsequently at different times and places.

This sharing allows a higher and more accurate capacity and speed of processing the detected data in any of the controlled access gates, with consequent greater speed of identification and therefore of the passage of subjects U through the gate itself, if authorized, or to alarm and transit blocking, if not authorized.

According to exemplified and preferred realization embodiments of the invention, SD detection sensors of the following types are used:

- MIMO radar, with multiple emitters and receivers between real and virtual, which allow the estimated detection of distance, speed and/or tracking of the user U in the detection cone CD with discrete unitary resolution UDD sufficient to reproduce the scene in the cone CD in 3D, such as to reproduce the distances DT of each pixel from the sensor 15 and associated camera 16;
- TOF camera, suitable for acquiring the 2D image and assigning, on the round trip flight time and for each pixel, the distance DT of each pixel, being the pixel in this case coinciding with the discrete unit detection resolution UDD of the sensor 15, so as to allow the scene in the cone CD to be reproduced in 3D;
- 3D structured light scanner, designed to project a structured light "pattern" in the spectrum of the visible or invisible frequencies and to detect its deformation on the affected subject, in order to reconstruct in 3D, by triangulation, the scene in the cone CD and the distance DT of each pixel with discrete unit detection resolution UDD of the sensor 15;
- 3D laser scanner, capable of emitting a laser beam and determining the distance DT of each pixel with discrete unit detection resolution UDD of the sensor 15 by scanning one or more laser beams.

Similarly, according to embodiments of the invention exemplary and preferred, but not limiting, camera sensors ST of the following types are used: RGB cameras, RGB-D cameras, 3D light field cameras ("3D vision"); infrared cameras, with dual infrared depth sensor consisting of an infrared projector and camera sensitive to the same band, cameras with structured light emitter and structured optical light measurement systems, ultraviolet cameras, laser cameras, optionally one 3D laser scanner, Time of Flight (ToF) type cameras, stereoscopic systems, single pixel cameras, thermal cameras.

As mentioned, therefore, according to the invention, the passage preferably includes a plurality of sensors 15, positioned and fixed on the frame 11 or released from it and arranged in any position (also thrown randomly in the detection area), preferably in correspondence of the inlet and outlet areas I1, I2 and of the transit area P, so that, when these sensors 15 are positioned, the various detection cones CD of the same overlap substantially covering the entire volume of the gate and of the gate volume including the entry and exit areas I1, I2 and the transit area P.

The use of this plurality of sensors 15 allows each of them to perform a partial detection, possibly with low resolution and quality; in any case, since all sensors 15 are connected to the electronic control unit 14, the aforementioned electronic control unit 14, equipped with artificial intelligence, receives and processes the signals arriving from the sensors 15 through machine-learning and/or deep techniques-learning, in order to autonomously learn the characteristics of the passage and predict the forms and probabilistic directions of each subject, reconstructing the scene in space at the passage and thus having with an adequate probability the detection and determination of the number and type of U subjects present near the gate, when entering the gate (present in the entry and exit areas I1 and I2) and present in the transit area P, with their positions, speed and trajectories during the passage of the U subjects in the aforementioned space and with relative forecast of a probable future trajectory evolution, starting from the position, speed and trajectory parameters detected by the sensors 15, 16; the aforementioned techniques also allow to obtain the identification with recognition and traceability of subjects U, objects and animals in transit in the entry and exit areas I1 and I2 and in the transit area P operating consequently on physical or virtual barriers of the passage to allow, as the case may be, the crossing or the barrier of the passage.

Furthermore, the use of a plurality of sensors 15 allows, together with the use of the partial data relating to the distances DT and the images from each sensor ST and thanks to the use of the electronic control unit 14, to reconstruct, through interpolation processes and machine-learning and/or deep-learning algorithms, a 2D and 3D probabilistic image of the face of each person in transit and therefore to implement facial recognition techniques, through prior association with databases containing images of persons authorized or not to transit; the control unit 14, through the deep learning processes, also allows to determine the type of the user U and, in a probabilistic way, which person, animal or object it is, as well as to understand if the user U is authorized or not by querying the database 18.

The partial data coming from the sensors 15 also allow to reconstruct, through the electronic control unit 14, the most probable form of any object in transit in the areas I1, I2 and P and therefore, always through machine-learning techniques and/or deep-learning and following a 2D, 3D reconstruction and an analysis of the related images, to catalog each U subject according to the type of object he carries with him (bag, suitcase, wheelchair, weapon, etc.), according to the type (man, woman, animal, dog, cat, etc.), according to the presumed age (adult, child, etc.), according to the presumed sex, based on the race, the mood (happy, discontented, etc.), etc., and what type of person, object, dog, cat, etc. it is, according to category criteria.

In an exemplifying and preferred but not limiting embodiments, a plurality of sensors 15, 16 are fixed to the frame 11 on the internal portions of the walls 11a, 11b; still advantageously the aforementioned sensors 15, 16 are fixed in pairs on the inside of one and the other wall 11a, 11b.

In further preferred embodiments, the entrance passage according to the invention can also provide for the installation of one or more sensors 20, 21 (independent or additional with respect to the plurality of sensors described above) positioned on the top of the walls 11a, 11b or on substantially vertical rods integral to the walls 11a, 11b themselves, in such a way as to provide an overall view of the entry and exit areas I1, I2 and the transit area P, as well as having a facial recognition function, of the type and the category of subjects U. The information of the sensors 20, 21 can be used or not together with the information provided by the sensors 15, 16 and therefore processed through artificial intelligence in the ways already described. These sensors 20, 21 can therefore be of the same type as the sensors 15, 16 already described and with the same functionality. This detection takes place thanks to the positioning of the sensors 15, 16, 20, 21, which are fixed or not to the frame 11 and which are located in correspondence of the gate so that the respective detection cones CD intersect each other substantially orthogonally (and in any case intersecting) by crossing (as shown in the attached FIGS. 6A, 6B, 6C, 6D). For example, a first series of sensors 15, 16 can have respective CD detection cones facing each other and substantially orthogonal to the gate passage axis and a second series of sensors 20, 21 can have respective detection cones CD substantially parallel to the axis of passage of the gate; as a whole, the detection cones CD of the sensors 15, 16, 20, 21 form a crossed grid, so as to allow the detection of the user U in transit within the volume of the access gate, including the entrance and exit areas I1, I2 and the transit area P. The flexibility of the system applied to the access gate according to the invention is determined by the fact that the positioning of each sensor 15, 16, 20, 21 is not tied to the logic of optimizing the vision of the scene in the passage volume; this obviously determines a partiality of information, since the individual information received by each sensor 15, 16, 20, 21 is insufficient to determine the nature and movements of the user U in the volume of the entrance passage, also because one or more sensors 15, 16, 20, 21 can also be placed in positions with reduced vision and in any case such that it is not possible to determine, by means of the local data of the distances DT and by means of the captured images, the nature of the user U, as well as its actual position coordinates, speed, trajectory, tracking, etc.

In this regard, this flexibility allows sensors 15, 16, 20, 21 to be placed even in hidden and protected positions that are difficult to access for any reason, including aesthetic or functional, for example so as not to allow an attacker to identify them easily and therefore tamper and/or damage them and not even understand if they are installed or not. For the purposes of the present invention it is also included the case in which a plurality of mobile devices (cell phones, smartphones, tablets) with sensors suitable for the purpose are used, each individually constituting at least a single sensor 15, 16, 20, 21.

A series of sensors 15, 16, 20, 21 are therefore positioned to control the gate, which present the intersecting and/or substantially orthogonal detection cones CD and in any case superimposed to cover the entire volume corresponding to the entry and exit areas I1 and I2 and to the transit area P; the images and position data detected by the various sensors 15, 16, 20, 21 are collected by the electronic control unit 14 and, therefore, through interpolation processes carried out using machine-learning and/or deep-learning algorithms, allow to indirectly determine the probable state of the passage of one or more subjects U in the passage that includes areas I1, I2 and P, as well as their position, speed, trajectory and tracking, with the relative forecast of the evolution of these coordinates in the near future. Furthermore, it is possible to identify the nature of these subjects U, the nature and/or the presence of objects and/or animals (with relative position, speed, trajectory, tracking, etc.) and the association of objects and/or animals to the person or persons accompanied by them during the passage in the gate. Finally, it should be noted that in order to obtain better results, sensors 15, 16 can be used which incorporate different detection technologies in combination with each other; in this case, measurements are obtained in the same detection cone CD (or in combinations of cones CD each using a different technology) in a redundancy regime and, by combining the probabilistic results of the various technologies, it is possible to further refine and optimize the quality of the detection carried out.

Operatively, once the presence of a user U has been detected and calculated its direction relative to the gate to be crossed and expected its evolution over time, the control unit 14 waits for a signal from the reader 17 on the validity of the access credentials; to carry out this control, the information acquired by the reader 17 is compared by the control unit 14 with the information contained in the database 18. Subsequently, the sensors 15, 16, 20, 21 recognize the face of the user U and the nature of the various subjects in transit and they will send the information to the control unit 14, which verifies through the database 18 whether he is actually the legitimate owner of the credential used and therefore the authorized subject AU to cross the passage and whether the subjects U in general are or not authorized.

At this point, the control unit 14 sends a command to the actuation unit 13 to move the door 12 (if present) and/or to allow the passage of the user U (possibly also in a personalized way according to the nature of the user U and the contingent scenario) and the same control unit 14, in communication with the sensors 15, 16, 20, 21, traces the trajectory of the user U through the detection area. When the user U leaves the transit area P, the control unit 14 sends a command to the actuation unit 13 to consequently move the door 12 (if present) from an open position to a closed position. The closure of door 12 is also implemented even if the user U has made the passage passing the barrier safely and unharmed and also immediately after passing the barrier without the user U has necessarily crossed the gate or the monitored area.

On the contrary, if the control unit 14 does not receive any information from the reader 17 or in the case in which the face of the user U does not correspond with that of the legitimate owner of the detected access credentials or in the case of subjects U in general unauthorized or in the presence of scenarios such as this is required (safety, security, emergency, etc.), the actuation unit 13 closes at least one of the doors 12 (if present) or prepares a alarm. It is also possible to detect the presence of stationary subjects U in the monitored area and, in case of dangerousness of the scenario, reporting the same to exit from this area and possibly give a local and/or remote alarm signal to the personnel in charge, indicating whether these are people or objects abandoned in the transit area P, indicating the nature of the user U and the degree of danger and urgency required for the intervention of the personnel. In practice, the use of a plurality of sensors and/or cameras 15, 16, 20, 21 allows the system, through the use of machine-learning/deep learning algorithms, to reconstruct the scenario related to the area of detection on the basis of images acquired even partially or incompletely, by making an estimate of the position, speed and trajectory parameters of the subjects U present in the detection area and a prediction of the probable evolution of the same parameters in the immediate future. Therefore, each sensor and/or camera 15, 16, 20, 21 can also have a limited and partial vision and less sensitivity or accuracy, given that the incomplete data are processed by the machine-learning/deep-learning algorithm, which allows to reconstruct the most probable scenario and have a sufficiently accurate overview, without the need to use more expensive instrumentation and more complex applications. Furthermore, the sensors and/or cameras 15, 16, 20, 21 are able to detect, to label and to track one or more unauthorized subjects U who intend to cross the entrance without authorization and the control unit 14 is able to distinguish them from authorized ones; this is possible thanks to the fact that it detects the information of all the subjects and users identified by processing the validated credential data sent by the reader 17, as well as, preferably, the facial recognition data. For example, if the number of validated credentials is less than the number of subjects identified U or the face of the subjects U or the nature of the subjects in general does not coincide with the face filed or the subject does not coincide in the database 18 for each credential, the control unit 14 denies the access until unauthorized individuals U leave the detection area or are removed.

Therefore, when an unauthorized user U, through any stratagem, tries to cross the gate, the control unit 14 is able to detect its presence and check whether one or more subjects U are authorized or not. Ultimately, the set of sensors 15, 16, 20, 21 used allow the recognition of the user U before it enters the access gate and, in particular, since the same is about to approach the entry and exit areas I1, I2; therefore, the entire system, thanks to the prediction of the trajectory of the user U, is able to prepare the gate in opening or closing or in alarm in an optimized manner, in order to achieve a rapid and comfortable passage of the user U, whatever his conditions are (handicapped, tall, short, young, child, elderly, animal, etc.), and/or objects he carries with him or his entourage, or in order to provide for securing the passage by blocking in advance and in a more efficient and effective way, compared to the known art, access to unauthorized persons or subjects U in general who attempt a fraudulent passage.

Finally, it is noted that the control unit 14 uses artificial intelligence and, in particular, one or more models of neural networks, machine learning (ML), deep learning (DL), capsule networks (capsule networks), reinforced deep learning (DRL), opposing generative networks (GAN), advanced data learning (augmented data learning), probabilistic programming, hybrid learning, automated machine learning (AutoML), digital twins (digital twins) and justifiable artificial intelligence (explainable AI).

The invention thus conceived is susceptible of numerous modifications and variations, all of which are within the scope of the annexed claims; all the details can be further replaced with other technically equivalent elements.

In practice, the materials used, as well as the contingent shapes and dimensions, can be any according to the requirements and the state of the art.

The invention claimed is:

1. A controlled access gate comprising:
   at least one frame (11), which defines at least one entry area (I1), at least one exit area (I2) and at least one transit area (P), wherein a user (U) is able to pass through said entry and exit areas (I1, I2) and said transit area (P),
   an actuation unit (13), which allows the passage of one or more users (U),
   an electronic control unit (14),
   a plurality of sensors (15) or video camera sensors (16) or a plurality of mobile electronic devices containing said sensors (15, 16),
   a badge reader (17) or other equivalent device connected to said electronic control unit (14) and configured to read information on a badge or other identification element of a user (U) or a biometric reader (17), the reader being also configured to send the read information to the control unit (14) for processing, in order to verify the identity of the user (U) in real time, so that an authorized user (AU) is able to pass through said gate,
   a database (18) containing data of not authorized and/or authorized (AU) users (U),
   wherein said sensors or video camera sensors (15, 16) are configured to detect at least partially the data relating to the distance (DT) between each sensor (15, 16) and each user (U) travelling along said entry and exit areas (I1, I2) or said transit area (P), said sensors (15, 16) are also configured to detect parameters relating to the instantaneous position, instantaneous speed and trajectory of each user (U), as well as images of at least one part of each user (U),
   each sensor (15, 16) being fixed or being movable with respect to said frame (11) and having a detection cone (CD) and a discrete unit detection resolution (UDD) for sensing at least one user (U) standing in or passing through said detection cone (CD), each sensor (15, 16) also being configured to communicate, by means of a wireless or a wired communication, with said electronic control unit (14), so as to be identified with data relating to a relative position and orientation (x, y, z) with respect to a reference system (X, Y, Z) which is coupled with said frame (11) of the gate, said data relating to a relative position and orientation of each sensor (15, 16) being sent to the electronic control unit (14) upon installation of said sensors (15, 16) and subsequently automatically in real time, wherein said sensors (15, 16) are installed in a volume corresponding to said entry area (I1) and/or to said exit area (I2) and/or to said transit area (P) of said gate without constraints positioning or orientation, so that at least two of said detection cones (CD) of respective sensors (15, 16) overlap, said data relating to the distance (DT), said parameters relating to the instantaneous position, instantaneous speed and trajectory of each user (U) and said images of at least one part of each user (U) being sent to said electronic control unit (14), which receives and processes said data, said parameters and said images through interpolation processes and machine-learning and/or deep-learning algorithms in order to independently learn the features of said gate and to estimate the shapes and directions of each user (U) within said volume corresponding to said entry (I1) and exit areas (I2) and to said transit area (P) of the gate, in order to reconstruct a scene in the space corresponding to said volume and to obtain a 2D and/or 3D detection of said users (U) with their positions, speeds and trajectories during the passage of said users (U) through said volume, starting from said parameters of instantaneous position, instantaneous speed and trajectory detected by said sensors (15, 16), and to estimate subsequent trajectories of said users (U) based on said parameters, characterized in that each sensor (15, 16) incorporates different detection technologies and is configured to self-calibrate, via said electronic control unit (14), once each sensor (15, 16) is installed, said sensors (15, 16) being configured to automatically send their relative data of position and orientation with respect to said reference system (X, Y, Z) when said sensors (15, 16) are installed and subsequently automatically and in real time and wherein a camera sensor (ST) of each sensor (15, 16) detects a partial and discrete image formed by discrete units (UDDi) or pixels of said at least one user (U), said image being coupled, inside said detection cone (CD), with the distances (DT) measured over time between each discrete unit (UDDi) and/or pixel of the image of said user (U) and said camera sensor (ST) and with the positions of each user (U) detected in said image, so as to reconstruct, through said interpolation processes and machine learning and/or deep learning algorithms, a 2D and/or 3D estimated image of each user (U) travelling along said entry and exit areas (I1, I2) and said transit area (P).

2. The controlled access gate as claimed in claim 1, characterized in that said users (U) are grouped according to the type, such as persons, objects or animals, according to the type of objects carrying with them and/or on the basis of parameters of presumed age, presumed sex, race, mood, etc., starting from a facial recognition of said users (U), so as to inhibit the passage of suspicious or unauthorized users (U) and to authorize the passage of authorized users (AU).

3. The controlled access gate as claimed in claim 1, characterized in that said gate includes barriers or doors (12) which are actuated to open and close at least partially a passage, said barriers or doors (12) being actuated simultaneously or independently, in a synchronized manner and/or in a same direction of travelling of said users (U) or independently and/or with said doors (12) moving in opposite passage directions with respect to each other, said gate further providing the passage of said users (U) in one or both directions and/or said barriers or doors (12) are actuated to open the gate with equal or different opening angles, so as to maintain a user's (U) passage width (D) which is variable and modulated on the basis of the minimum space required for the travelling of each user (U).

4. The controlled access gate as claimed in claim 1, characterized in that said actuation unit (13) is connected to said electronic control unit (14), so as to open or close said gate and/or to send an alarm signal in case of fraudulent passage.

5. The controlled access gate as claimed in claim 1, characterized in that said sensors (15, 16) use MIMO radars to detect said data relating to the distance between each sensor (15, 16) and each user (U).

6. The controlled access gate as claimed in claim 1, characterized in that said electronic control unit (14) and/or said database (18) are made by one or more physically distinct units, also via cloud.

7. The controlled access gate as claimed in claim 1, characterized in that said database (18) and said electronic control unit (14) are shared with several access gates, also remotely positioned, so as to acquire the information detected by each access gate, even at different times, with respect to said users (U), so as to estimate step by step the identity and type of said users (U), by updating the relative data acquired by one or more gates sharing said database (18) and said electronic control unit (14).

8. Kit of sensors (15) or video camera sensors (16) associated with a controlled access gate according to claim 1.

* * * * *